J. C. ANDERSON.
Sash-Balance.
No. 198,179. Patented Dec. 18, 1877.
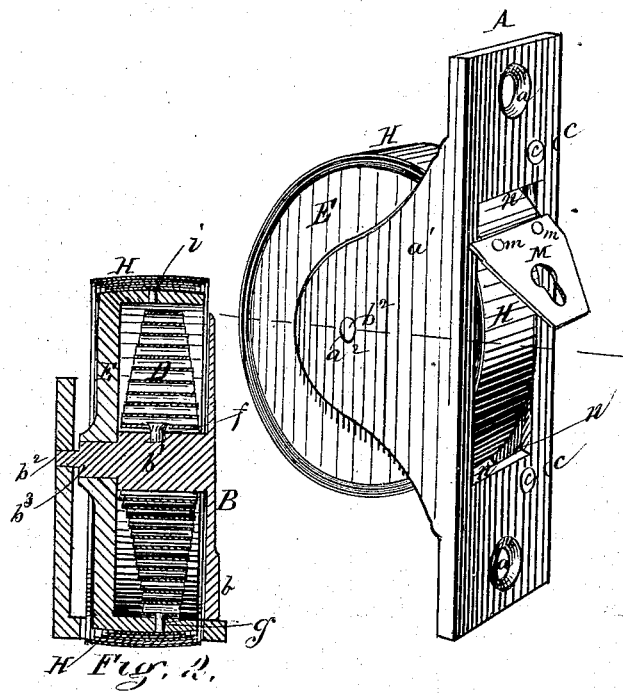
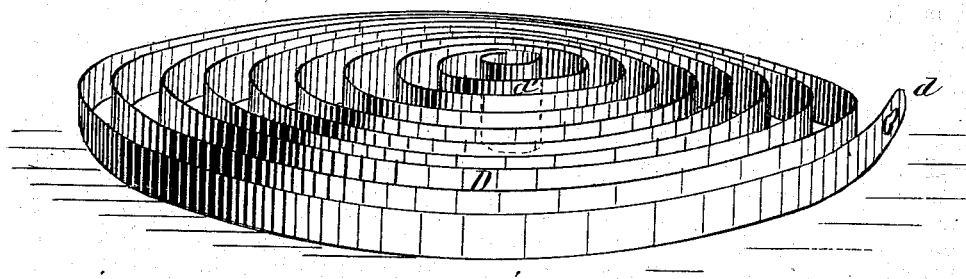
Witnesses
R. W. Smith
Albert Martin
Inventor
J C Anderson

UNITED STATES PATENT OFFICE.

JAMES C. ANDERSON, OF ALLEGHENY, PENNSYLVANIA.

IMPROVEMENT IN SASH-BALANCES.

Specification forming part of Letters Patent No. 198,179, dated December 18, 1877; application filed May 1, 1877.

*To all whom it may concern:*

Be it known that I, JAMES C. ANDERSON, of Allegheny city, Allegheny county, Pennsylvania, have invented a new and useful Improvement in Sash-Balances, which improvement is fully set forth in the following specification, reference being had to the accompanying drawing.

Similar letters of reference indicate corresponding parts.

My invention relates to the balancing of window-sashes, by which they may be raised and lowered by a mere touch of the hand, and will remain evenly balanced when raised or lowered at any point desired; and my invention consists, mainly, in the employment of two flat tapered coil springs, acting in conjunction with each other, one of which is coiled within a cylindrical pulley, and being tapered from the inner end toward the outer end of the same, and tempered to give out force by the outward recoil of the spring, thereby transmitting a rotary motion and force to the pulley, while the other spring is coiled around the outside or periphery of the pulley, and tapered from the outward end toward the inner end of the same, and made to impart a like rotary force in the same direction as the inner spring.

By reason of the fixedness imparted to it by being tempered when in the coil, thereby rotating the pulley by the recoil of the spring in an inward direction, and also by combining the two tapered springs, greatly enhanced power is applied to, and utilized in, the balancing of window-sashes within a small space, and with economy of construction, more particularly where windows of very heavy plate-glass are used, all as hereinafter more fully described and claimed.

In the accompanying drawing, Figure 1 shows a perspective view of my balance detached from the window frame and sash. Fig. 2 represents a horizontal transverse sectional view of the same; and Fig. 3 the inside tapered spring as removed from the cylindrical pulley of the balance.

The entire frame of the balance is cast in two pieces, the part A forming a face-plate for securing the balance to the window-frame by means of screws at $a$ $a$, and a support, $a^1$, for securing the end of the shaft at $a^2$.

The part B forms the shaft $b^1$ and support $b$, and is secured to the part A by the clamping-rivets $c$ $c$ and the tenon $b^2$, by which means the frame is held firmly in place. The support $b$ also serves as a protection to the tapered spring D. Formed upon the shaft $b^1$ is a gudgeon, $b^3$, which serves as a journal upon which the pulley E revolves. Attached to the shaft $b^1$ is a rivet-pin, $f$, which serves as an attachment for the inner end of the spring D to the shaft $b^1$.

The pulley E is cast of cylindrical shape, having one end closed, forming a journal with the shaft $b^1$ at $b^3$, upon which it is supported and revolves, and is kept in position laterally by means of the journal of the shaft and the support $a^1$ of the frame. Within the cylindrical opening of the pulley E is inserted the tapered coiled spring D. The outer end $d$ of the tapered spring D is secured to the pulley E by the rivet-pin $g$, and the inner end $d'$ of the tapered spring D is secured to the shaft $b^1$ by the rivet-pin $f$.

The tapered spring D is made of steel, of the desired length, width, and gage to suit the different weights of the sashes to be balanced, and is made tapering from the inner end $d'$ to the outer end $d$ of the same, or from where it is secured to the shaft $b^1$ to the pulley E, the outer end of the spring being thus tapered to about one-half of the width of the inner end. The tapered spring D is tempered when in a straight piece, and, being thus tempered, and then coiled within the cylindrical pulley E, imparts a rotary force to the pulley by the tendency of the spring to recoil, unwind, or resume its straight position in which it was tempered. I taper the spring in the direction of its width, preferably, although it may be tapered as to the thickness thereof.

The tapered spring H is made in like manner to the tapered spring D, except that it is tapered from the outer end to the inner end thereof, and in a slighter degree, remaining at the inner end about three-fourths the width of the outer end, and is tempered while coiled, with the further difference of its being made slightly concave toward the pulley E, the pulley E being made convex on the periphery of the same, to correspond with it. The spring being thus made concavo-convex, increased force is added to the recoil of the same. The inner end of the tapered spring H is fastened to the pulley E by means of the rivet-pin at $i$, and coiled around the periphery of the pulley. The outer end of the tapered spring H is passed through the opening $n$ in the frame-plate A, which opening is made of sufficient size to allow the spring to work through it freely. The spring is secured there, when at rest, by means of the shoulders $m\ m$ on the attachment M. The sash is secured to the tapered spring H by means of the slotted opening in the attachment M, which is hooked on over the head of a screw in the edge and near the bottom of the sash. The balances are mortised in the window-frame, and secured to the frame by means of the screws in the plate A at $a\ a$, immediately behind the edges of the sash at the meeting-rails. Being so placed they are out of sight, and also not exposed to the weather.

In the operation of my balance it will be seen that the shaft is a part of the frame, and remains stationary while the pulley revolves thereon. The inner tapered spring, being secured to and encircling the shaft, is made fast at the skirt or outer circumference of the spring; and the outer tapered spring also being fixed to the periphery of the pulley, and attached to the sash, great force is applied to the rotation of the pulley and to the balancing of the sash by the application of the power from both tapered springs to the circumference of the pulley, thereby gaining the united force of the two springs and the leverage on the pulley.

In small or light windows, where the weight to be balanced is no object, a metallic or flexible strip may be used for suspending the sash, in place of the outer tapered spring.

I am aware that the tapered spring of itself is not new, but I am not aware that it has ever been utilized before so that it could be used in the balancing of sash.

Having thus described my invention, what I claim, and desire to secure by Letters Patent, is—

1. In a sash-balance, the tapered springs D and H, acting in conjunction with each other, substantially as described and shown, for the purpose set forth.

2. In a sash-balance, the combination of the tapered spring D, cylindrical-chambered pulley E, two-part frame-work A B, and a sash, attached by a suitable connecting device to the periphery of the cylindrical pulley, substantially as described and shown, for the purposes set forth.

3. The two-part frame A B, secured together by the clamping-rivets $c\ c$ and tenon $b^2$, in combination with the cylindrical-chambered pulley E, and tapered springs D and H, substantially as described and shown, for the purposes set forth.

JAMES C. ANDERSON.

Witnesses:
JOHN H. STEVENSON,
EDWD. ABEL.